United States Patent [19]

Jackson

[11] Patent Number: 5,683,105
[45] Date of Patent: Nov. 4, 1997

[54] ELECTROMECHANICAL AUTOMOTIVE AIR BAG INFLATOR

[75] Inventor: Scott A. Jackson, Centerville, Utah

[73] Assignee: Morton International, Inc., Chicago, Ill.

[21] Appl. No.: 682,871

[22] Filed: Jul. 12, 1996

[51] Int. Cl.$^6$ .................................................. B60R 21/26
[52] U.S. Cl. .......................... 280/737; 280/741; 222/3
[58] Field of Search ................................ 280/737, 736, 280/741, 740, 742, 728.1; 222/3, 333

[56] References Cited

U.S. PATENT DOCUMENTS 2,849,159  8/1958  Kaufmann ........................ 222/333
3,788,596  1/1974  Maeda ............................. 280/737
5,301,979  4/1994  Allard ............................. 280/737

*Primary Examiner*—Peter C. English
*Attorney, Agent, or Firm*—Gerald K. White

[57] ABSTRACT

An electrically energized coil or solenoid activates a magnetic piston/plunger assembly which forces pressurized gas out of a container through a diffuser and into an air bag without using pyrotechnic material, and thereby eliminating all of the undesirable effects associated with current state of the art inflators (i.e., particulate, smell, smoke, manufacturing dangers, etc.).

10 Claims, 1 Drawing Sheet

ELECTROMECHANICAL AUTOMOTIVE AIR BAG INFLATOR

BACKGROUND OF THE INVENTION

1. Field of the Invention

This invention inflates an air bag, when needed, without using any pyrotechnic material.

2. Description of the Related Art

An inflatable air bag is a safety device for protecting automotive vehicle occupants in a collision. When the vehicle strikes or is struck by a harm producing object, a collision sensor detects the change in motion and fires a detonator. This releases gas under high pressure from an inflator into a folded inflatable air bag. The air bag expands and provides a protective cushion that restrains the driver or passenger against various impact conditions.

Many types of inflators have been disclosed in the art for inflating an air bag for use in an inflatable restraint system. One involves the utilization of a quantity of stored compressed inert gas which is selectively released at the stored temperature to inflate the air bag. Another derives a gas source from a combustible gas generating pyrotechnic material which, upon ignition, generates a quantity of hot gas sufficient to inflate the air bag. In a third type, the air bag inflating gas results from a combination of stored compressed inert gas and a pyrotechnic gas generating material. The last mentioned type, commonly referred to as an augmented gas or hybrid inflator, delivers hot gas to the air bag.

The inflator may comprise a quantity of high pressure inert gas in a storage cylinder or bottle. An advantage accrues, however, where a stored compressed gas augmented by a generated gas is utilized. This advantage involves the addition of energy to the stored compressed gas to aid in filling of the air bag. Current technology with hybrid inflators to obtain this advantage is to heat the stored high pressure gas with some type of pyrotechnic. Such hybrid inflators, however, are subject to a disadvantage, even when argon is used as the stored compressed gas, because the gas delivered to inflate the air bag is hot and is intermixed with a gas produced by combustion of the pyrotechnic. Such systems are subject to manufacturing dangers, and moreover, fill air bags with adverse gases, particulates, or smoke that smell and can be irritating or noxious.

As disclosed in U.S. Pat. No. 5,301,979 granted to John E. Allard and assigned to the assignee of the present invention, the energy added to the system by a pyrotechnic to aid in filling the air bag with stored cold pure pressurized inert gas is mechanical as distinguished from the application of heat energy which causes the gas to expand. The presence of a high energy pyrotechnic, however, to produce the energy keeps in existence a latent capacity for manufacturing dangers and the occurrence of undesirable admixtures.

Thus, there is a need and a demand for improvement in inflators to the end of overcoming the foregoing disadvantages. The present invention was devised to fill the gap that has existed in the art in these respects.

SUMMARY OF THE INVENTION

It is an object of the invention to provide an inflator that provides a cold gas which meets the needs of a gas for inflating an air bag without the disadvantages discussed above.

Another object of the invention is to provide an inflator that delivers cold pressurized pure inert gas to an air bag with the addition of purely mechanical energy to aid in filling the air bag.

A further object of the invention is to provide an inflator that delivers a cold pressurized inert gas to an air bag without requiring the use in any way of any pyrotechnic material and thereby eliminating all of the undesirable effects associated with current state of the art inflators, that is, manufacturing dangers, adverse gases or smoke that smell and can be irritating or noxious.

In accomplishing these and other objectives of the invention, a high strength cylindrical container or bottle is filled with a pure compressed or pressurized inert gas such as argon or nitrogen. The invention uses an electrically energized coil which may consist of one or more layers of windings, and which is commonly called a "solenoid," to activate, when energized, a piston/plunger assembly which forces the pressurized gas out through a diffuser and into air bag without using any pyrotechnic material.

The various features of novelty which characterize the invention are pointed out with particularity in the claims annexed to and forming a part of this specification. For a better understanding of the invention, its operating advantages, and specific objects attained by its use, reference is made to the accompanying drawing and descriptive matter in which a preferred embodiment of the invention is illustrated.

BRIEF DESCRIPTION OF THE DRAWINGS

With this description of the invention, a detailed description follows with reference being made to the accompanying figures of drawing which form part of the specification, and of which.

DESCRIPTION OF THE PREFERRED EMBODIMENT

Figure 1:
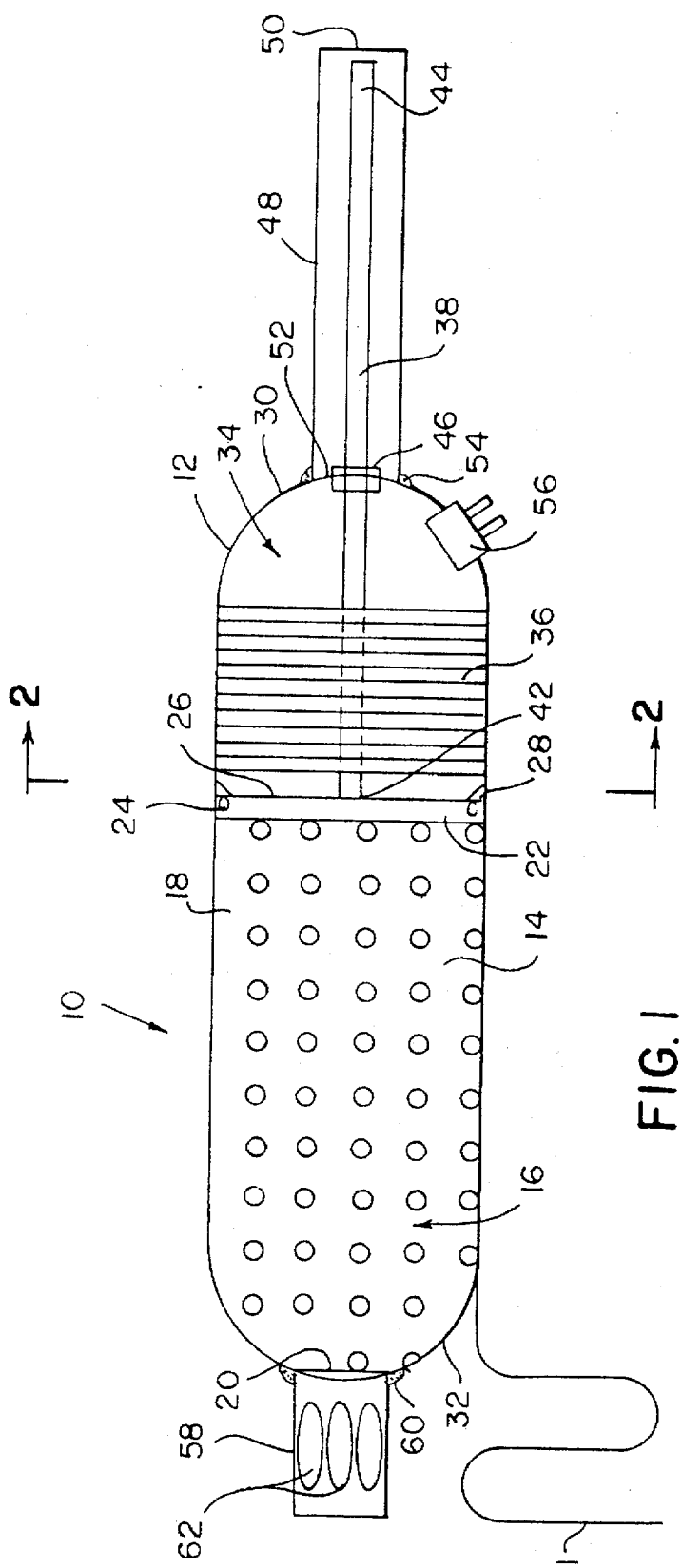
FIG. 1 is a cross sectional side view illustrating the inflator of the present invention.

Referring to the drawings, there is illustrated an inflator assembly 10 for inflating a vehicle occupant restraint such as an air bag 1. The inflator assembly 10 comprises a high strength container or bottle 12 made of a non-magnetic material which defines over a substantial portion thereof a chamber 14 that is filled with a pure pressurized inert gas 16 (that is, argon, nitrogen). Included within the chamber 14 of container 12 is an elongated cylindrical section 18. Chamber 14 is normally sealed by a burst disk 20 so that the pressurized gas stored therein does not escape.

A plunger or piston 22 having a piston ring 24 is located during storage in the cylindrical section 18 at one end 26 thereof, at which a circular abutment 28 is located. The end 26 of the cylindrical section 18 is located intermediate first and second ends 30 and 32, respectively, of the container 12.

An electromechanical mechanism 34 is located in container 12 behind the piston 22, that is, between the piston 22 and the first end 30 of the container 12. The pressure of the gas in the container 12 is the same on both sides of the piston 22 during storage.

Figure 2:
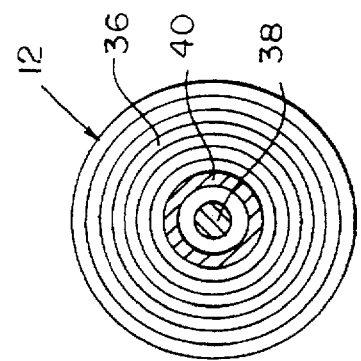
FIG. 2 is a cross sectional view taken along the lines 2—2 of FIG. 1.

The electromagnetic mechanism 34 includes an electrically energizable coil or solenoid 36 and a magnetic plunger or rod 38. The solenoid 36 is located in the container 12 between the first end 30 of the container 12 and the piston 22 and comprises a winding of electrical wire of one or more layers that is wound on a tubular non-magnetic form 40, as illustrated in FIG. 2.

One end 42 of the magnetic plunger 38 extends through the tubular non-magnetic form 40 of the electrically energizable coil or solenoid 36 and is attached to the piston 22 at a central location of the latter. The other end 44 of the plunger 38 extends through the first end 30 of the container 12 through a non-magnetic sleeve or bushing 46 that is there provided. The bushing 46 is mounted in the end 30 of the container 12 and permits relative motion of itself and the plunger 38.

In order to allow the pressure on both sides of the piston 22 to be the same during storage of the inflator, an elongated tube 48 of suitable non-magnetic material that is closed at one end 50 and open at the other end 52, is positioned over the portion of the plunger 38 that extends out of the container 12. The open end 52 of the tube 48 is attached to the end 30 of the container 12 in suitably sealed relation, as indicated by the sealing material 54, for example, a weld.

The plunger 38 extends through the end of the container 12 for a sufficient distance to allow the solenoid 36, when initiated, that is, electrically energized from an external source, to move the plunger 38 and thereby the piston 22, a distance, as required, to effect the transfer of the pressurized gas 16 to the air bag 1.

For facilitating the electrical energization of the solenoid 36 from an external source, an initiating means comprising a pin type electrical terminal 56 is located externally on the first end 30 of the container 12. The two pins of the terminal 56 are connected internally of the container 12 by lead wires (not shown) to the ends of the solenoid 36.

Burst disk 20 is located at the opposite end of the cylindrical section 18 at a position adjacent the end 32 of the container 12. The burst disk seals a release or outlet conduit or diffuser 58 that is in communication with the air bag 1. The periphery of the diffuser 58 is sealed to the second end 32 of the container 12 by a suitable weld 60. The diffuser 58, as shown, includes a plurality of outlet ports 62.

When the solenoid 36 is electrically energized, for example, by the connection of an appropriate direct electrical current source of proper polarity and magnitude, as known to those skilled in the electrical art, to the terminal 56, the plunger 38 is pulled into and through the solenoid 36. This moves and forces the piston 22 down the cylindrical section 18. Such movement of the piston 22 increases the pressure of the pure inert cold gas 16 in the chamber 14. When the pressure in the chamber 14 exceeds the strength of the burst disk 20, the pure inert cold gas in the chamber 14 expands through the diffuser 58 into the air bag 1.

The energy added to the inflator assembly 10 by the forced movement of the piston 22 down the cylindrical section 18 aids in filling the air bag with the cold pure inert gas that had been stored in chamber 14. Such energy is purely mechanical and has been produced in the inflator 10 without the presence therein of any pyrotechnic material. The use of such energy does not cause the admixture with the pure inert gas of other gases or particulates.

The outlet ports 62 of the diffuser 58 throttle the flow of the cold pure inert gas, providing the proper fill rate for the air bag 1. Coarse screen or perforated metal sheet (not shown) may be provided in cooperative association with the diffuser 58 to prevent fragments of the burst disk 20 from leaving the inflator 10 and entering the air bag 1.

Thus, in accordance with the invention, there has been provided an inflator assembly that produces pure inert cold gas to fill an air bag. The inflator according to the invention meets the needs of a cold pure inert gas for inflating an air bag without the disadvantages of being heated or made impure or tainted by contact or admixture with other gases, particulates or smoke that can be irritating or noxious.

With this description of the invention in detail, those skilled in the art will appreciate that modifications may be made to the invention without departing from the spirit thereof. Therefore, it is not intended that the scope of the invention be limited to the specific embodiment that has been illustrated and described. Rather, it is intended that the scope of the invention be determined by the scope of the appended claims.

What is claimed is:

1. An inflator for delivering pure inert cold gas to an air bag comprising, a container in which a pressurized cold pure inert gas is stored, said container having a first end and a second end, said container including a cylindrical section positioned between said first end and said second end and having an outlet conduit positioned at said second end, said outlet conduit being sealed by a burst disk that ruptures upon a predetermined increase of pressure in said container, a piston in sealed, slidable relation over a substantial portion of the length of said cylindrical section of said container, said piston during storage of said cold pure inert gas in said container being positioned at the end of said cylindrical section that is closest to the first end of said container, electromagnetic means positioned between said piston and the first end of said container with both sides of said piston being at the same pressure during storage of said pure inert gas in said container, and means for activating said electromagnetic means.

2. An inflator as defined by claim 1 wherein said electromagnetic means includes an electrically energizable coil wound on a tubular non-magnetic form, and a magnetic plunger that extends through said tubular non-magnetic form and is attached at a first end to said piston.

3. An inflator as defined by claim 2 wherein the second end of said magnetic plunger extends through a bushing that is provided in the first end of said container.

4. An inflator as defined by claim 3 wherein an elongated tube of non-magnetic material that is closed at one end and open at the other end is positioned over the portion of said plunger that extends out of the first end of said container, with the open end of said elongated tube being attached in sealed relation to the first end of said container.

5. An inflator as defined by claim 1 wherein said electromagnetic means includes an electrically energizable coil, and further including electrical terminal means located externally on said first end of said container for providing electrical energization to said coil from an external source of electrical current.

6. An inflator as defined by claim 1 further including a circular abutment located on said cylindrical section of said container at the end thereof closest to said first end of said container, said circular abutment defining the position of said piston during storage of said cold pure inert gas.

7. An inflator as defined by claim 1 wherein said piston is positioned in sealed, slidable relation over a substantial portion of the full length of said cylindrical section of said container by a piston ring.

8. An inflator as defined by claim 1 wherein said outlet conduit includes opposed outlet ports which throttle the flow of the cold pure inert gas to provide a proper fill rate for the air bag.

9. An inflator as defined by claim 8 wherein said outlet conduit includes a diffuser.

10. An inflator for delivering pure inert cold gas to an air bag comprising, a container in which a pressurized cold pure inert gas is stored, said container having a first end and a second end, said container including a cylindrical section positioned between said first end and said second end of said container and having an outlet conduit positioned at said second end, said outlet conduit being sealed by a burst disk that ruptures upon a predetermined increase of pressure in said container, a piston in sealed, slidable relation over a substantial portion of the full length of said cylindrical section of said container, said piston during storage of said pure inert gas in said container being positioned at the end of said cylindrical section that is closest to the first end of said container, electromagnetic means positioned between said piston and the first end of said container with both sides of said piston being at the same pressure during storage of said pure inert gas in said container, and initiating means for activating said electromagnetic means, whereby, upon activation of said electromagnetic means by said initiating means, said piston is driven through a substantial portion of said cylindrical section to increase the pressure of the pressurized cold pure inert gas in said container, and when the pressure in said container exceeds the burst disk strength, the burst disk ruptures and allows the pressurized cold pure inert gas in said container to expand through said outlet conduit to an air bag to be inflated.

* * * * *